March 16, 1943. J. O. JACKSON 2,313,997
PRESSURE STORAGE TANK
Filed Sept. 11, 1939 9 Sheets-Sheet 1
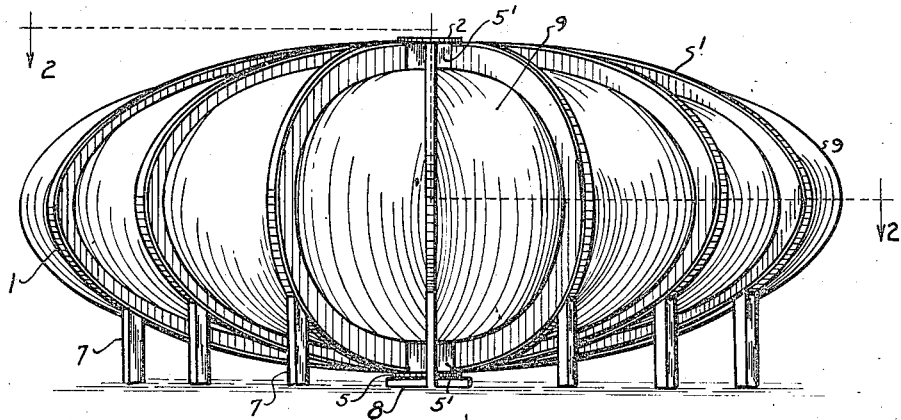
Fig. 1
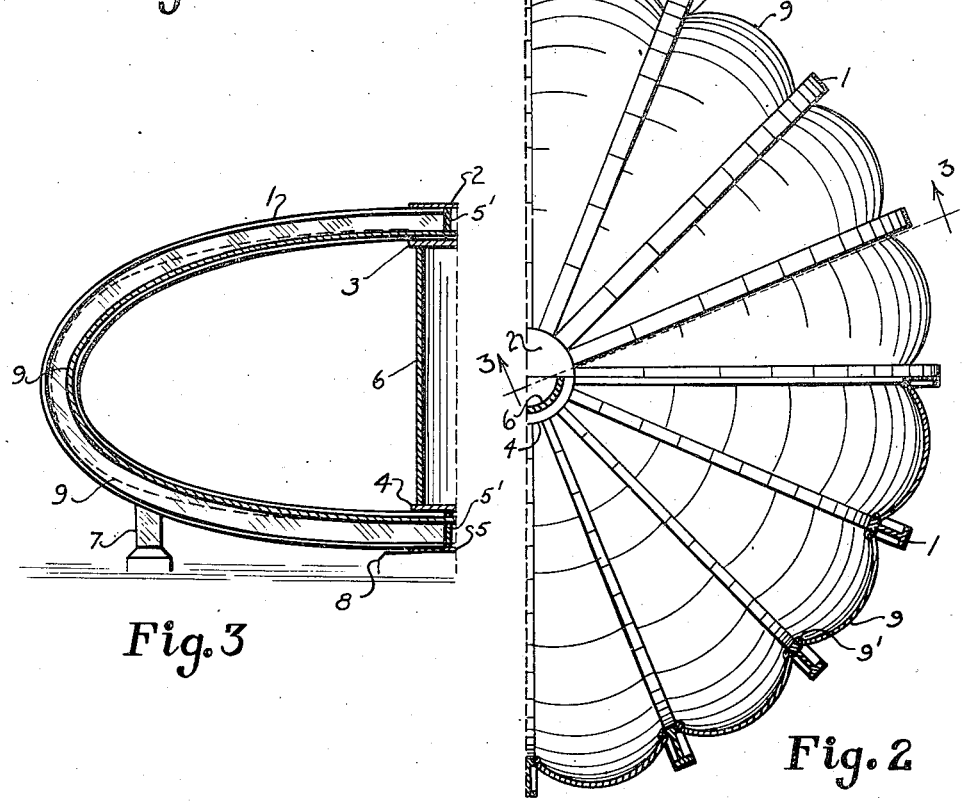
Fig. 3
Fig. 2
INVENTOR.
James O. Jackson
BY Richard E Marine
ATTORNEYS.

March 16, 1943.  J. O. JACKSON  2,313,997
PRESSURE STORAGE TANK
Filed Sept. 11, 1939  9 Sheets-Sheet 2

INVENTOR.
James O. Jackson
BY Richard C. Marine
ATTORNEYS.

March 16, 1943. J. O. JACKSON 2,313,997
PRESSURE STORAGE TANK
Filed Sept. 11, 1939 9 Sheets-Sheet 3

INVENTOR.
James O. Jackson
BY Richard E. Marine
ATTORNEYS.

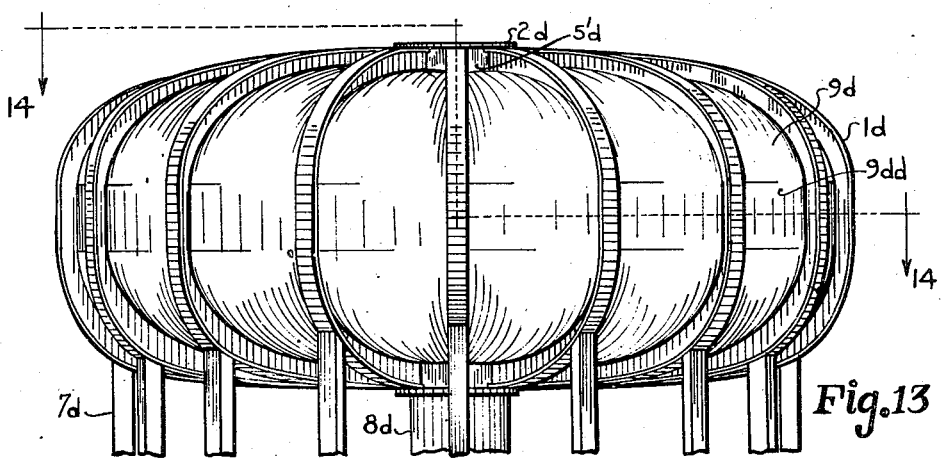
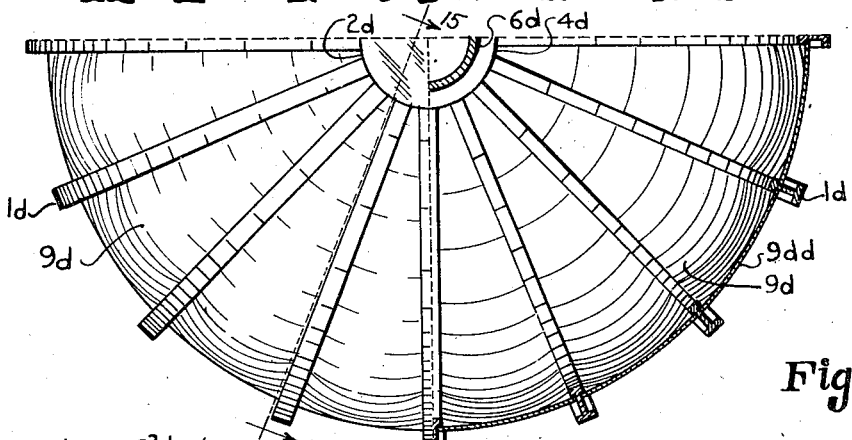
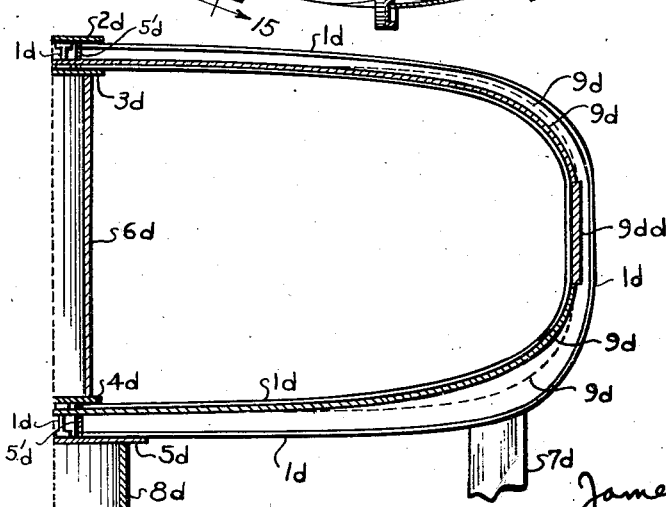

March 16, 1943.　　J. O. JACKSON　　2,313,997
PRESSURE STORAGE TANK
Filed Sept. 11, 1939　　9 Sheets-Sheet 6

INVENTOR.
James O. Jackson
BY Richard E Marine
ATTORNEYS.

March 16, 1943.　　　J. O. JACKSON　　　2,313,997
PRESSURE STORAGE TANK
Filed Sept. 11, 1939　　　9 Sheets-Sheet 7

INVENTOR
James O. Jackson
BY Richard E. Manine
ATTORNEY

March 16, 1943.    J. O. JACKSON    2,313,997
PRESSURE STORAGE TANK
Filed Sept. 11, 1939    9 Sheets—Sheet 9

INVENTOR
James O. Jackson
BY Richard C. Maxine
ATTORNEY

Patented Mar. 16, 1943

2,313,997

UNITED STATES PATENT OFFICE 2,313,997

PRESSURE STORAGE TANK

James O. Jackson, Crafton, Pa.

Application September 11, 1939, Serial No. 294,235

8 Claims. (Cl. 220—1)

This invention relates to tanks or containers for the storage of liquids under pressure or under a gravity head.

Pressure tanks have, for many years, been built of cylindrical shells with dished or elliptical heads. Such tanks are convenient and economical in small sizes but for tanks of considerable capacity they are not economical because a greater thickness of steel is required in a cylindrical shell than in spherical or other double curved surfaces. These tanks have the further disadvantage that when built in large sizes they are flimsy and require considerable supporting structure if placed horizontally or a tower structure for support if placed vertically.

Spherical tanks have also been built for many years and are very efficient containers for gases under pressure since the internal pressure tends to maintain the original shape of the sphere. However, for the storage of liquids under pressure the spherical shells tend to slump when partially or even completely filled and, therefore, require supporting structure to prevent buckling.

Spheroidal tanks have been developed more recently which have the general shape of a sphere with its vertical axis shortened. These tanks may theoretically be designed very efficiently for the conditions of stress when the tank is full of liquid and subjected to a given internal gas pressure. Such conditions are, however, seldom realized in the use of the tank and under conditions of partial filling or partial gas pressure the tendency to buckle becomes very severe which requires that the tanks be braced and stiffened to prevent collapse. A further disadvantage of such tanks is that for extremely large sizes and the shortened vertical axis the radius of curvature of the upper portion becomes quite large requiring plates of excessive thicknesses. A still further disadvantage is that such tanks are usually supported directly on the ground with resulting corrosion hazards and inaccessibility of the surfaces for periodic inspections.

Noded spheroidal tanks are a more recent development. These tanks are in the form of a solid of revolution about a central vertical axis comprising a central portion with an upwardly curved top and a downwardly curved bottom having its periphery closed by one or more peripheral portions each in the shape of a flat torus and the provision of tension members joining the top and bottom where the separate portions join. These tanks have less of the ideal theoretical shape of the spheroidal tanks and due to the noded roof construction have a natural tendency to slump which must be resisted by bracing and supporting structure. They have the advantage that the upper surface is divided into several annular curved surfaces which effectively resist the internal pressure with a smaller metal thickness. These tanks have the disadvantage that a considerable amount of stiffening and supporting structure is required in order to resist the tendency of the diaphragm-like top to collapse when the pressure is lowered and due to the difficulty of supporting the overhanging portions of the shell structure which introduces bending moments of considerable magnitude which must be resisted by girder and truss-like members throughout the interior. These structures are usually built with the bottom surfaces in contact with the ground and have the same disadvantages noted under spheroidal tanks above.

My invention consists of a new and novel type of tank in which the supporting stresses are not imposed upon the tank shell but are carried by structure which may be accurately designed and in which the shell may be shaped or disposed so as to be capable of resisting large pressures and in which the shell stresses are subject to accurate and economical design.

In the form of my tank which is best suited for the storage of liquids under internal gas pressure it consists essentially of a series of girder-like rings approximately elliptical in shape arranged radially about a vertical axis coinciding with the minor axis of each of the elliptical rings. Between the elliptical rings are a series of membrane surfaces approximately segmental in shape connected to and filling completely the spaces between the girder rings. The function of the membrane surfaces is to contain and confine the tank contents and pressures and to convey and transmit to the girder-like rings the weights and pressures caused by the confinement of the tank contents. The function of the girder rings is to absorb and resist the reactions of the membrane surfaces and to transmit the weight of the tank contents to the supporting media without imposing punching or bending forces on said membrane surfaces.

The membrane surfaces are curved in a vertical direction approximately the same as the girder rings and in a direction normal to the interior surfaces of the girder rings the membrane segments are curved with any desired radius of curvature. In this construction the membrane surfaces are double curved, can easily be made concave to the pressure and the maximum radius of such double curved surfaces is much smaller than on other types of tanks because the outside surface of the shell is not a surface of revolution and thus the maximum radius of curvature in the segmental plates is determined by the vertical radius of curvature which is usually much smaller than the horizontal radius of curvature in conventional tanks.

In the construction the membrane stresses are entirely transmitted to the girder-like rings and no stresses are carried continuously around the tank in the membrane surfaces as is the case with conventional tanks. Since the membrane stresses are entirely carried by the girder-like rings the loads on such rings are considerable and I have found it to be advantageous to tie opposite sides of the rings together in a vertical direction which permits me to reduce to any desired amount the degree of bending remaining in the girder rings. I find it is most economical to carry in the vertical ties a sufficient portion of the membrane stresses so that that remaining will require about the same girder section as the supporting loads themselves require.

It is, therefore, believed that my invention has the advantage that the weight of the tank contents may be supported by girder-like members which are efficient and economical for that purpose and that the shell stresses caused by the internal pressure may be resisted by very economical membrane surfaces which are subjected only to axial stresses and that the stresses in the girder-like rings may be reduced by the use of vertical, horizontal or angular ties across the girders to obtain the most economical combined stresses in the structure. It has the further advantage that tanks of very large capacity may be supported on foundations or tower structures so that the membrane surfaces are clear of the ground and, therefore, may be properly maintained.

While I have described the form of my invention which, in my opinion, is most suitable for storing liquids under pressure, other forms have desirable advantages, for example, tanks of approximately spherical shape may be surrounded with my system of closed ring girders which may be designed to support the weight of the tank contents and to stiffen the spherical shell and to prevent it from slumping and buckling. In this application of my invention the membrane stresses in the spherical surface are only partially transmitted to the ring girders, such transmission as occurs being due to the relative elastic properties of the membrane surfaces and the ring girders. There is obviously no economy in the spherical membrane surface except as results from a more effective support of the weight of the tank contents.

Another form of my invention producing desirable results is the use of my vertical ring girders disposed about the surface of a tank formed entirely or partially of a spheroidal surface in which case the economies and results would be approximately the same as with the spherical tank.

Another form of my invention in which very desirable results are secured is in the construction of tanks for the storage of liquids with no or only a very small internal gas pressure. In Patent 2,086,131, Jackson, I employed radial girders and a substantially flat bottom portion to support the weight of the tank contents over the said flat bottom. Other tanks have been built using radial girders under substantially flat bottoms to support the weight of the tank contents. In some cases the flat bottoms have been convexed downwardly between the radial girders. These tanks proved to be economical in supporting the weight or vertical pressure of the tank contents. My present construction retains all of these advantages and in addition enables me to make the bottom curved rather than substantially flat and further enables me to transfer to the girders not only the weight or vertical pressures from the liquid but also the horizontal and angular pressures resulting in bursting stresses in the tank shell. Such bursting stresses are a very important factor in large tank designs and as previously explained my ring girders enable me to materially reduce the maximum membrane radius thus reducing the thickness and cost. A still further advantage of my new construction with reference to this class of tanks is that I can eliminate the cylindrical section of shell heretofore used at the point of largest diameter making the shell of the tank smoothly curved from the bottom to the top.

While the advantages of my invention are greater using membrane plates curved outwardly throughout the tank another possible form of my invention which produces desirable results is a form in which the ring girders extend completely around the tank but the membrane surfaces are bulged outwardly only in about the lower half of the tank where the pressures are the greatest and in the upper half of the tank the membrane surfaces conform to a surface of revolution about the vertical tank axis. The continuous girder rings act to distribute the weight and most of the horizontal bursting stress to the supporting structure and also supports the roof preventing its collapse.

Still another form of tank in which my invention has merit is a type of tank similar to that just previously described except that the ring girders are not carried completely around the tank but terminate at a point below the extreme top of the tank. Such discontinuous girders are not as efficient as the continuous ones but in certain forms of tanks used under certain conditions this lack of efficiency may be offset by other economies.

In general my invention consists of three elements. First, a series of curved ring girders disposed radially about their common minor vertical axes such ring girders being used to support a tank structure. Second, a series of membrane surfaces lying between and connecting to the previously mentioned ring girders and completely filling the space between them. Third, ties or struts between opposite sides of the ring girders.

The ring girders may be supported at points which will produce maximum economy. The section of the girders may be varied to suit the loads imposed upon them. They may be of any curvature and may be continuous or discontinuous. They may be inside or outside or intermediate of the tank shell.

The membrane surfaces may be flat or curved inwardly or outwardly or may correspond to a surface of revolution about the vertical tank axis. Their radii normal to the interior surface of the ring girders may be varied to obtain maximum economy.

The ties or struts between the girders may or may not be used. If used, there may be only one at the vertical tank axis or any number or a great many. Such ties or struts may be used to suitably tie together opposite or adjoining parts of the ring girders to best reduce to a minimum the bending stresses in the girder rings.

It is, therefore, a primary object of my invention to provide a pressure storage tank which more economically resists internal or external pressures and in which the supporting stresses may be more accurately determined and which may be built to withstand larger volumes and pressures than is practical with existing types.

A further object of my invention is to provide a tank structure having rigid girder-like elements suitable to being supported by tower like structures.

In the accompanying drawings showing for purposes of exemplification, but without limiting my invention or claims thereto, certain practical embodiments of the fundamental principles of my invention:

Figs. 1, 4, 7, 10, 13, 16, 19 and 22 are side elevations of various different forms of my invention: Figs. 2, 5, 8, 11, 14, 17, 20 and 23, in part, each show a one-fourth plan view and in part a one-fourth horizontal section taken on lines 2—2, 5—5, 8—8, 11—11, 14—14, 17—17, 20—20 and 23—23 of the various forms shown in the above figures, respectively; Figs. 3, 6, 9, 12, 15, 18, 21 and 24 show vertical half-sections of said various forms, respectively, taken on lines 3—3, 6—6, 9—9, 12—12, 15—15, 18—18, 21—21 and 24—24 of Figs. 2, 5, 8, 11, 14, 17, 20 and 23 respectively, the sections being taken immediately adjacent to one of the girder rings; Figs. 25 to 29 inclusive are diagrams showing the manner in which the stresses are transferred from the membrane to the curved girder sections.

In the various figures like parts are given similar numbers but with different sub-letters for the various forms.

Figure 4:
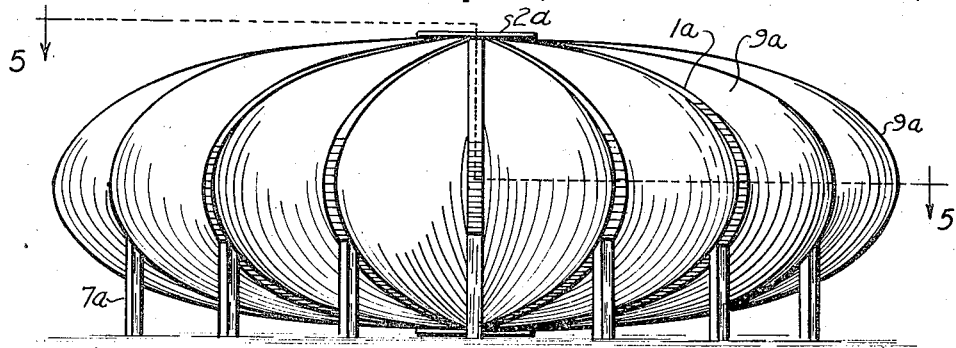

In Figs. 1, 2 and 3, the girder rings 1 are shown to be approximately elliptical in shape and are arranged radially about the vertical axis of the tank. These girder rings 1 are made up for convenience in half-rings which are shown as joined together near the tank axis by disc-shaped plate members 2, 3, 4 and 5 which are securely attached to the girder rings as by welding so that they will transmit tensions, compressions, bending moments and shears from the one-half to the other. Filler plates 5' may be employed to close the space between girders if desired. A tubular column member 6 may advantageously be provided, which is usually economical though not essential to the function of the structure.

Its purpose is to tie the circular girders together at their mid-point which considerably reduces their necessary size and weight because of the reduction in the maximum bending moments.

The purpose of said girder rings is to transfer the marginal reactions of the membrane segments to the supporting means. The said girders are not necessarily uniform in depth but may be proportioned to best resist the varying loads imposed upon them.

Foundations or columns 7 support girder rings 1 at some distance from the vertical axis and a foundation 8 supports the girder rings at and near the vertical axis. Segmental-shaped membranes 9 made of sheet metal correspond at their edges to the shapes of the girder rings 1, to which they are attached, shown at 9', as by welding or riveting, or the like, such membranes being curved in two principal directions, at any point, the first curve lying in a radial plane passing through such point and the principal vertical tank axis and the second curve lying in a plane normal to the first curve and also passing through such point.

The purpose of said membranes is to form a pressure tight closure between the said curved girders and to transmit the reactions of the weight and pressure of the tank contents to the said curved girders whereby they may be most effectively and directly transmitted to the supporting means. Said membrane surface being proportioned as to cuvatures and thickness so as to safely withstand the weight and pressure of the tank contents and being subjected principally to axial tensile and compressive stresses.

In Figure 3 the segmental membranes 9 are shown in section where they are cut by the section line 3—3, the outermost extent of their curvature being shown in dotted lines in this view.

Figure 5:
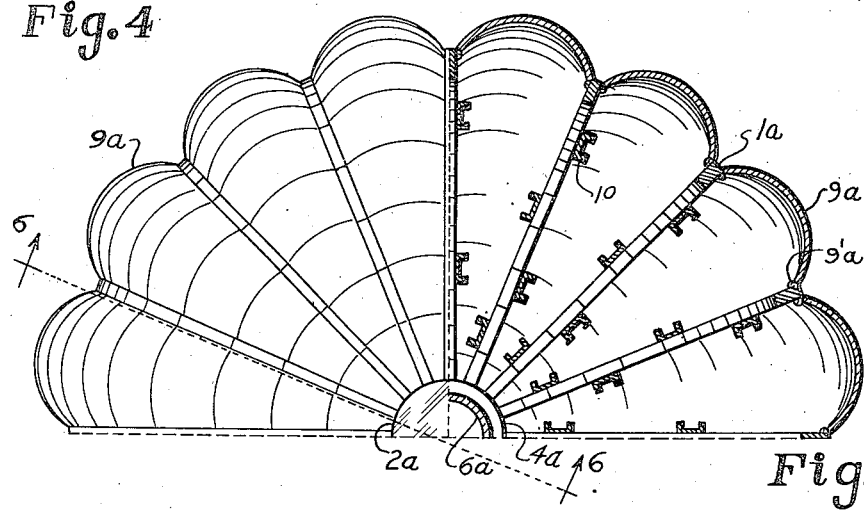
Figure 6:
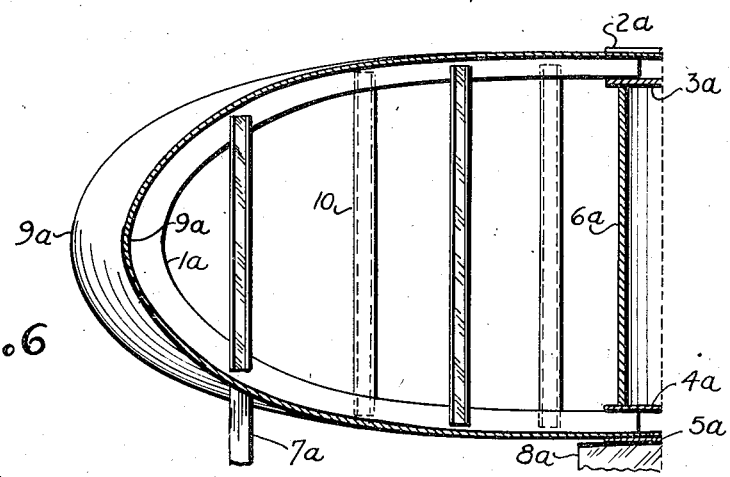

Figures 4, 5 and 6 show another form of my invention in which the girder rings 1a are positioned principally on the interior of the tank and are braced with vertical members 10 shown in Figures 5 and 6. The use of the vertical bracing members 10 is advantageous when the pressures are very large or when the tank is very low as compared with its diameter. These ties still further reduce the necessary size of the curved girders by greatly reducing the unbalanced forces acting to cause stresses in the girders. The parts 2a, 3a, 4a, 5a, 6a, 7a, 8a and 9a correspond to similar parts in Figures 1, 2 and 3.

Figure 7:
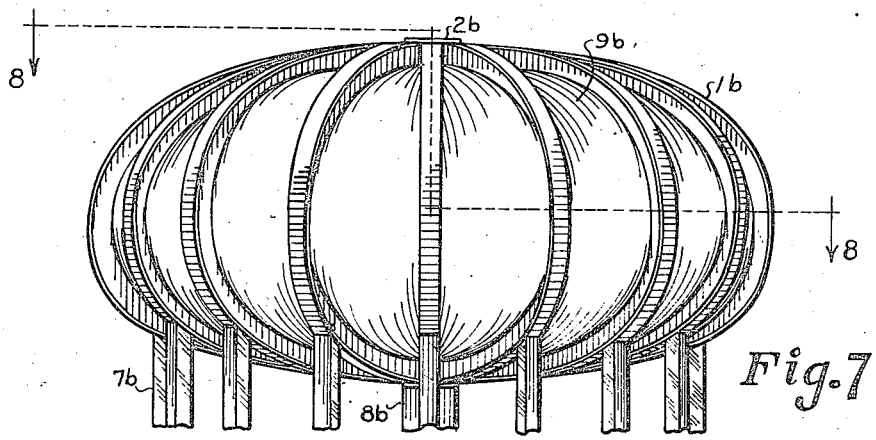
Figure 8:
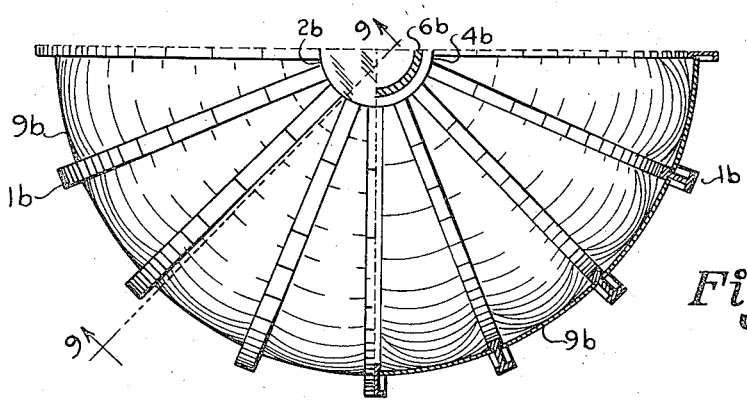
Figure 9:
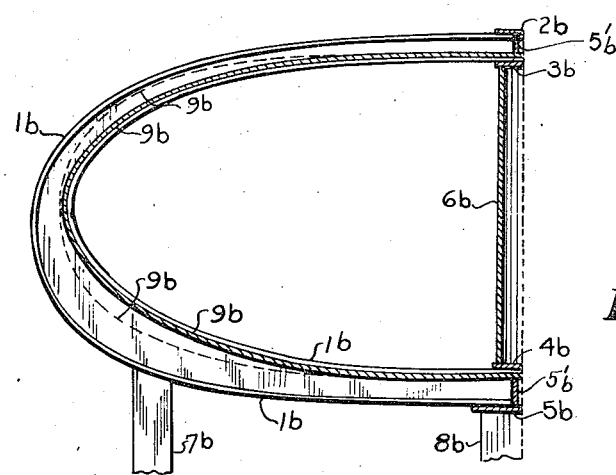

Figures 7, 8 and 9 illustrate a form of my invention in which the horizontal radius of the segmental plates at their mid-point is made to correspond with the principal horizontal radius of the tank. The parts 1b, 2b, 3b, 4b, 5b, 6b, 7b, 8b and 9b correspond to similar parts in Figures 1, 2 and 3. Although the membrane stresses are somewhat increased at their mid-elevation there are certain manufacturing economies possible with this form of my invention which in certain cases, as for example, in the storage of liquids under pressure of the liquid head only offset the additional membrane thickness required. In such cases, it is advantageous to still further increase the depth of the curved girders immediately over the supporting means 7b. This type of my invention is economical where the internal pressure is not excessive.

Figure 10:
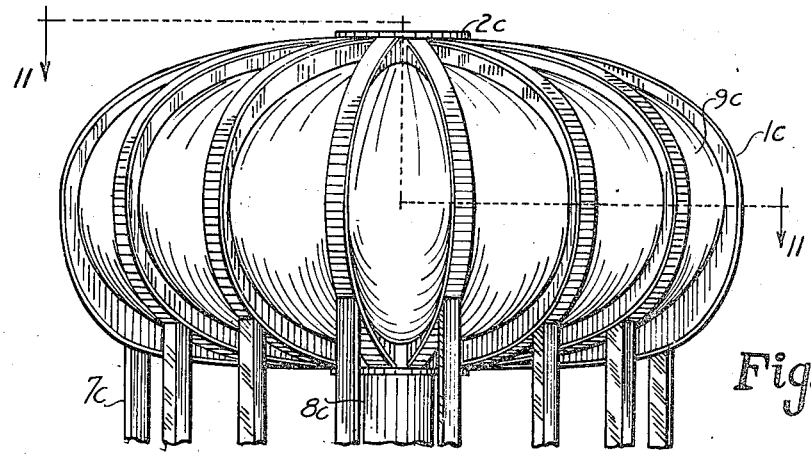
Figure 11:
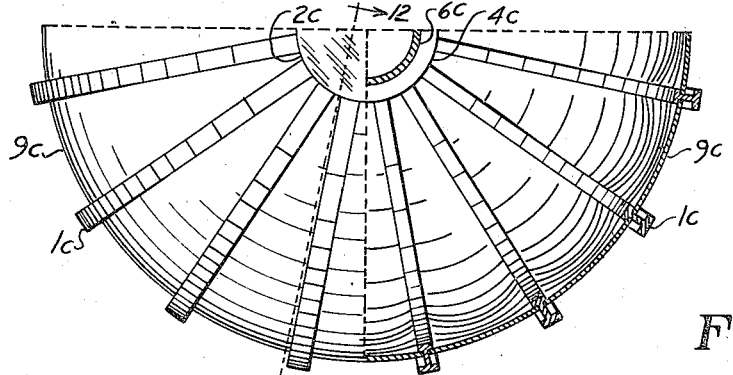
Figure 12:
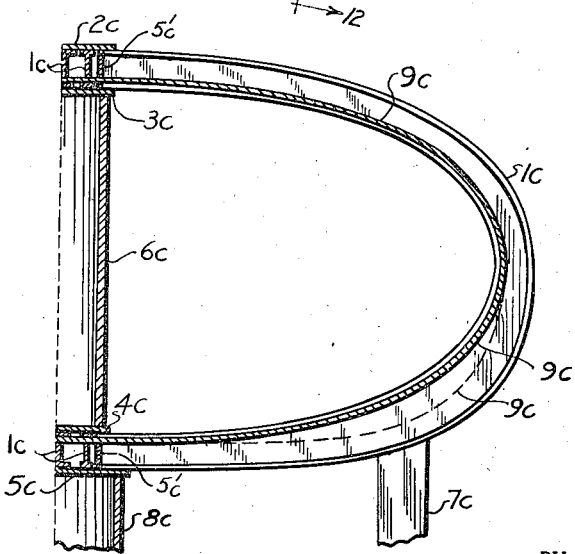

Figures 10, 11 and 12 show a form of my invention where the upper halves of the segmental membrane sheets form a surface of revolution, while the lower halves are curved or scalloped similar to like plates in both halves of Figures 1, 2 and 3. The parts 1c, 2c, 3c, 4c, 5c, 6c, 7c, 8c and 9c correspond to similar parts in Figures 1, 2 and 3. This form is especially suitable for tanks for the storage of liquid under its own gravity head or pressure or with a very slight additional pressure where the pressure on the upper half of the tank is small, justifying the economy of the simpler fabrication.

Figures 13, 14 and 15 show a form of my invention in which the segmental membrane plates have a cylindrical portion $9dd$ at their midsection, such cylindrical portion corresponding in radius to the principal horizontal radius of the tank, and being made of increased thickness because of its decreased ability to resist pressure. The parts $1d$, $2d$, $3d$, $4d$, $5d$, $6d$, $7d$, $8d$ and $9d$ correspond to similar parts in Figures 1, 2 and 3. This form is economical where it is desired to obtain a greater capacity without materially increasing the tank diameter.

Figure 16:
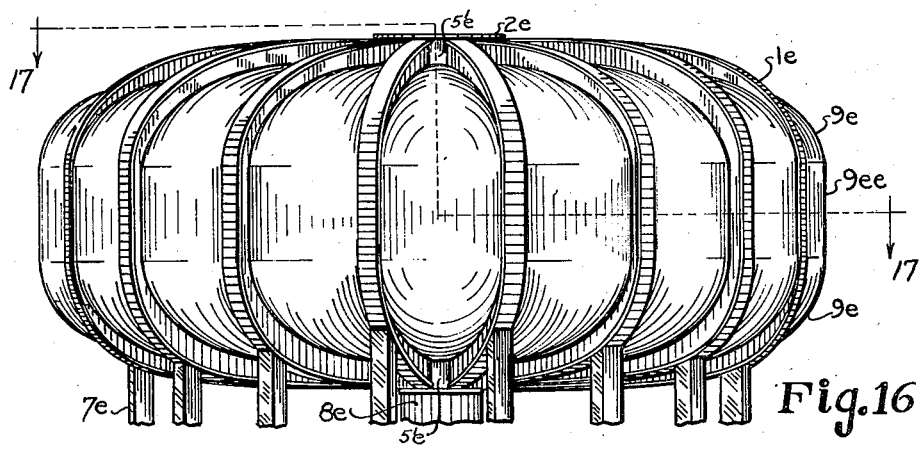
Figure 17:
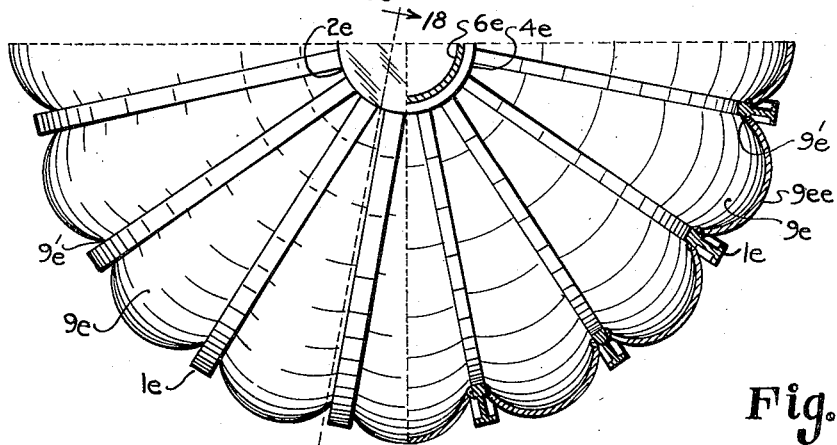
Figure 18:
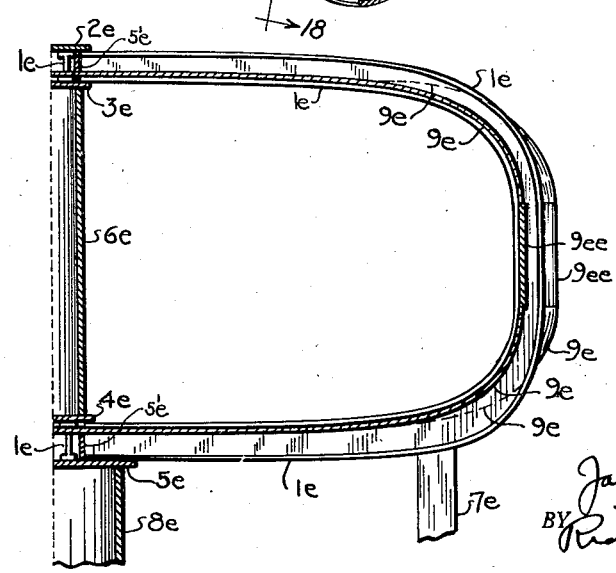

Figures 16, 17 and 18 show a form of my invention in which the individual segmental membrane sections become portions of cylinders at their midsection $9ee$. Such cylindrical portion having a radius smaller than the principal horizontal radius of the tank, the increased thickness being less than in the form shown in Figure 13, because of the smaller cylindrical radius. The parts $1e$, $2e$, $3e$, $4e$, $5e$, $6e$, $7e$, $8e$ and $9e$ correspond to similar parts of Figures 1, 2 and 3. This form is suitable where the tank capacity must be as large as possible as compared with its diameter and where the internal pressure is relatively large.

Figure 19:
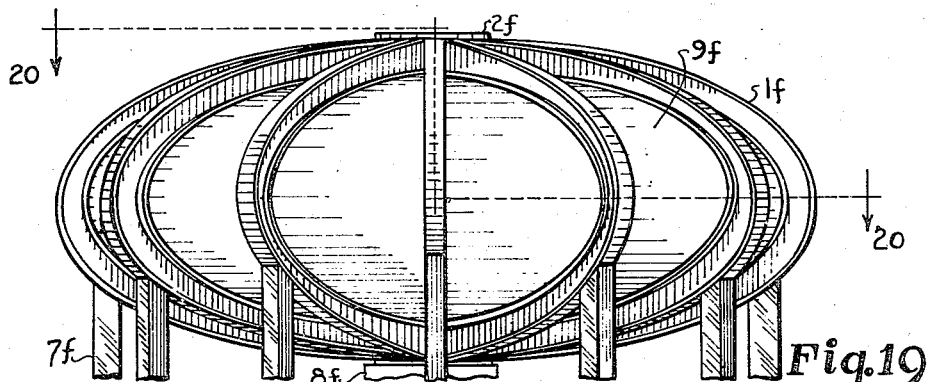
Figure 20:
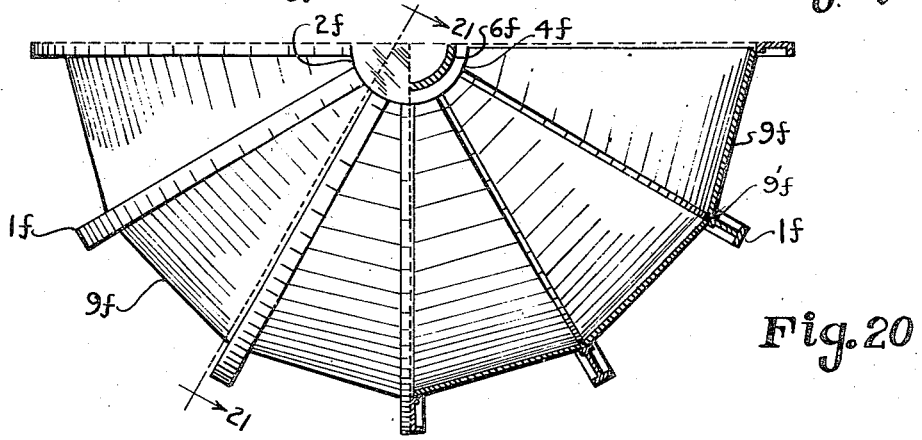
Figure 21:
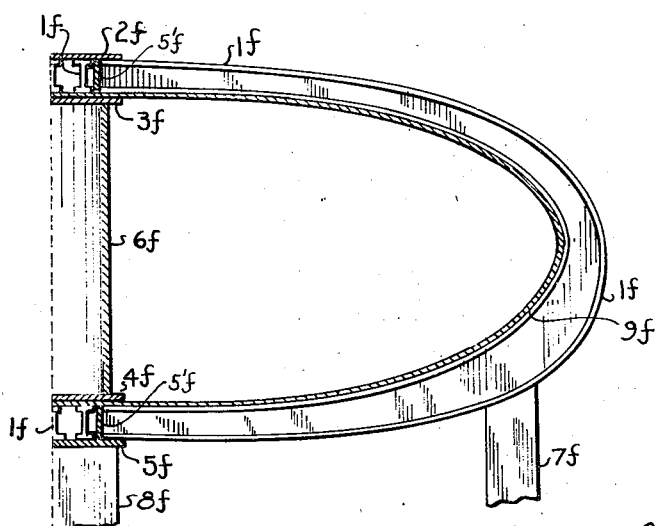

Figures 19, 20 and 21 show a form of my invention in which the segmental membrane portions are formed by sheets which are curved in only one direction. The parts $1f$, $2f$, $3f$, $4f$, $5f$, $6f$, $7f$, $8f$ and $9f$ correspond to similar parts in Figures 1, 2 and 3. This form is less costly to manufacture but requires thicker membrane sheets. It is especially suitable in cases where the sheets may advantageously be shipped direct from the rolling mill to the job where they may be cut to fit and curved as they are set in position.

Figure 22:
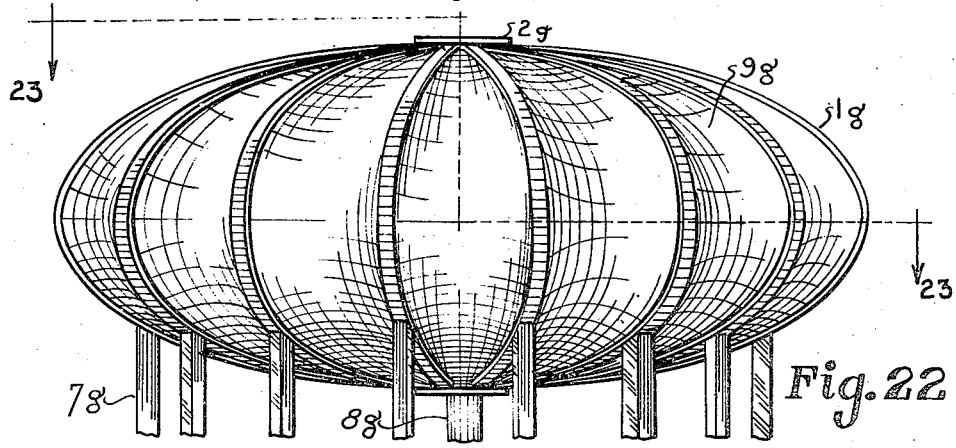
Figure 23:
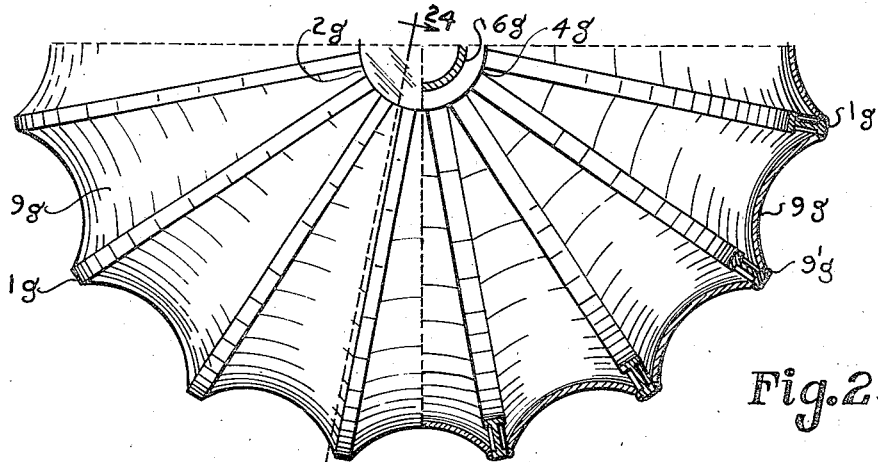
Figure 24:
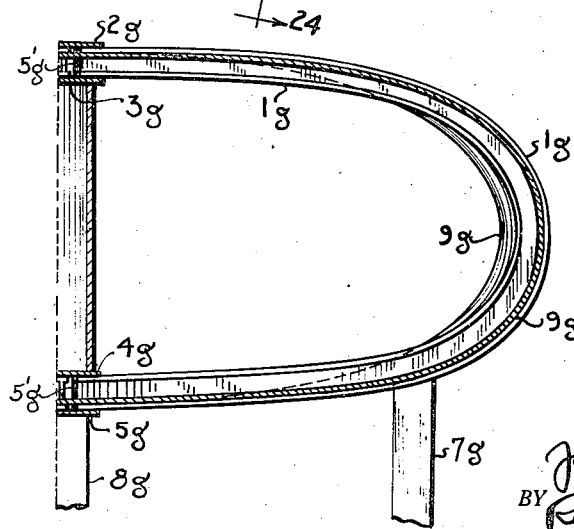

Figures 22, 23 and 24 show another form of my invention in which the curvature of the segmental membrane portions $9g$ is reversed. The parts $1g$, $2g$, $3g$, $4g$, $5g$, $6g$, $7g$, $8g$ and $9g$ correspond to similar parts in Figures 1, 2 and 3. This form is suitable for resisting external pressures, that is, for storing liquids or gases under a reduced pressure or under a partial or complete vacuum.

The method of calculating the stressses in the membrane surfaces is as follows. An elemental area of the surface with sides parallel to the principal directions of curvature is loaded with a normal internal force at the center of the element, said force being equal to the internal tank pressure on such elemental area and balanced by the resultants of the stresses along the edges of said elemental area acting in directions determined by the curvatures of the membrane element. The thickness of the membrane surface is made sufficient to resist the membrane stresses with a proper factor of safety.

My method of calculating the stresses in the curved girders and determining their design is as follows. The membrane stresses are imposed on the girders along the two principal directions of curvature of the membrane surface and the forces applied to the girders per unit of membrane length in either of said directions are equal in intensity to the stresses in the adjacent membrane surfaces themselves.

Figure 25:
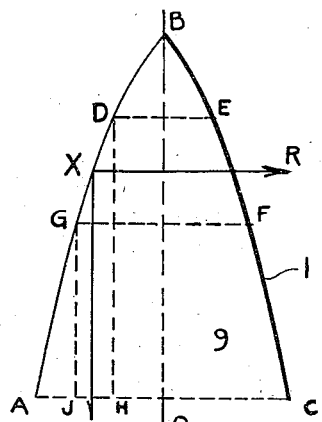
Figure 25 shows the upper half of one of the membrane segments 9.

Figure 25 illustrates a portion of a membrane surface ABC attached to girder AB on one side and to girder BC on the other. This surface is divided into many strips only one being shown for purpose of illustration. At any point X along the edge of girder AB a strip of any convenient width DEFG is drawn normal to both girders. At the intersection of the sides DE and FG with AB a second strip with sides DH and GJ is drawn parallel to median line BO. The membrane stresses in strip DEFG acting parallel to it are applied to the girder along edge DG but are assumed to be concentrated in a resultant "R" at point X. Likewise the membrane stresses in strip DHJG and parallel to it are also assumed to be concentrated in a resultant "r" at point X.

There are equal resultant forces imposed on the girder from the adjacent membrance surface on the other side of girder AB. The curvature of the adjacent membrane surface is identical but reversed.

Figure 26:
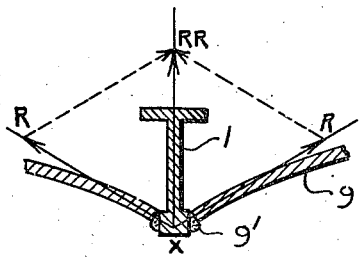
Figure 26 is a vertical section through girder 1 and adjoining membrane plates number 9 at point X of Figure 25.

Figure 26 is a section through girder AB at point X and normal to the girder and shows resultants XR on either side of the girder which resultants may be combined into a single force XRR acting normal to the curve of the girder and in the plane of the girder.

Figure 27:
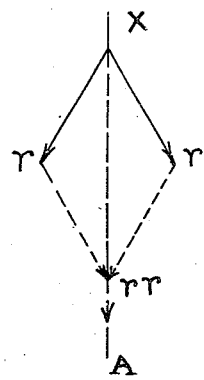
Figure 27 shows the resultant action of forces in a plane tangent to the inside of the girder at point X and normal to the plane of the girder.

Figure 27 shows a plane tangent to the curve of the inside of the girder at point X and normal to the plane of the girder AB. Resultant forces Xr on either side of the girder act in this plane and may be combined into a single force Xrr acting tangent to the curve of the girder and in the plane of the girder.

Figure 28:
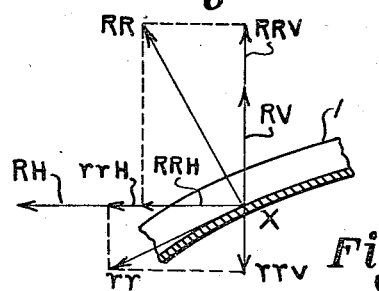
Figure 28 is an elevation of a portion of the girder at point X showing resultant forces at that point.

Figure 28 shows an elevation of a portion of the girder with force Xrr acting tangential and force XRR acting normal to the curve of the inside of the girder. Force XRR may be divided into its horizontal and vertical components RRH and RRV respectively and force rr may likewise be divided into its horizontal and vertical components rrh and rrv respectively. These four components may then be combined algebraically into two resultant forces RH and RV acting horizontally and vertically respectively which represent the final loading on the girder at point X.

Figure 29:
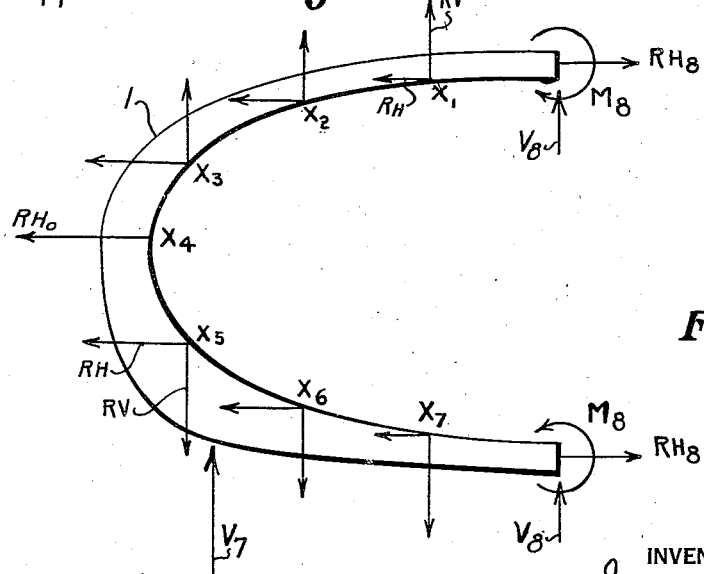
Figure 29 is an elevation of one of the half girders 1 showing the final resultant forces which act upon it.

Figure 29 shows a final loading diagram for one of the half girders on which the resultant forces for points X1, X2, X3, etc., are illustrated. The reactions from the supporting structure are indicated as V8 at the center and V7 near the periphery. The supporting force V8 is divided due to the internal tubular column 6 between the lower portion and the upper portion of the girder ends. Bending moment M8 and thrust RH8 are indicated acting on the lower and upper ends of the half girder ring. It is to be understood that the directions of the moments and the directions of the thrusts are not in all cases as shown in Figure 29 for these directions depend upon the relative magnitude of the internal pressures and the distance support V7 is located from the center of the tank. In actual design a larger number of points X1, X2, X3, etc., would be used for accurate results. Having thus obtained the complete loading on each half ring the location and magnitude of the maximum or controlling bending moments and thrusts may be determined in the usual manner for designing ring girders, for example, by the method of least work analysis as described by Eugene E. Lundquist and Walter F. Burke in report 509 of the National Advisory Committee for Aeronautics, entitled "General equations for the stress analysis of rings," and the component parts of the girders, the web flanges and stiffeners may then be proportioned to most effectively accommodate such combined stresses.

The design of the other half of the girder is identical as are the remaining girders because of the symmetry of loading conditions.

It is obvious from the foregoing description that the large and relatively thin membrane surfaces are supported in such a manner that the supporting stresses which are induced in such membrane surfaces are no greater than the stresses which are inherent to such surfaces by virtue of the internal pressure and weight of liquid alone. In other words the novelty and virtue of my design consists in having discovered a method of supporting thin membrane surfaces in such a manner that such surfaces are not overstressed by the reactions of supporting members but are kept free to function as membrane surfaces stressed entirely in tension or compression but not subjected to any direct punching or bending stresses. On the other hand the members which do support the weight of the tank and its contents may be made as rigid structural girder-like elements capable of withstanding effectively such supporting loads.

While I have shown and described certain embodiments of my invention it is to be understood that it is capable of many forms and modifications. Changes, therefore, in the construction and arrangement may be made without departing from the spirit and scope of the invention disclosed in the appended claims in which it is my intention to claim all novelty in my invention as broadly as possible in view of the prior art.

What I claim as new and desire to secure by Letters Patent, is:

1. A closed tank adapted to store a gas and/or a liquid under pressure comprising a supporting frame and a plurality of segmental membrane-like members attached thereto, said supporting frame being composed of a plurality of girder-like members curved throughout substantially their entire length and disposed in planes radiating from the principal vertical axis of said tank and having upper and lower extremities terminating adjacent the principal vertical axis of the tank, and means independent of said membrane-like members integrally interconnecting said upper extremities and lower extremities, respectively, of said girder-like members, said interconnecting means being adapted to transmit the end axial and bending reactions of each said girder-like members through said interconnecting means into the other said girder like members.

2. The combination as defined in claim 1 in which the points of attachment of said membrane-like members to said girder-like members lie substantially on a surface of revolution about said principal vertical tank axis.

3. A closed tank adapted to store a gas and/or a liquid under pressure comprising a supporting frame and a plurality of segmental membrane-like members attached thereto, said supporting frame being composed of a plurality of similar girder-like members disposed in planes radiating from the principal vertical axis of said tank and having upper and lower extremities terminating adjacent the principal vertical axis of the tank, and means independent of said membrane-like members integrally interconnecting said girder-like members at their upper and lower extremities adapted to transmit the end axial and bending reactions of each girder-like member through said interconnecting means into the other of said girder-like members, each said membrane-like member being disposed between adjacent girder-like members and completely enclosing the space therebetween, and said membrane-like members being curved in two directions at any point throughout a substantial portion of their areas, the radius of curvature in the first direction being that of a curve lying in a radial plane passing through said point and the principal vertical tank axis, the radius of curvature in the second direction being that of a curve lying in a plane normal to the first curve and also passing through said point.

4. The combination as defined in claim 1 in which each of said girder-like members has one or more braces or ties inter-connecting upper and lower points of said girder-like members.

5. The combination as defined in claim 1 in which the girder-like members have a common brace or tie located approximately at the vertical tank axis rigidly connecting said interconnecting means.

6. The combination defined in claim 3 in which the girder-like members are provided with vertical members attaching their upper and lower ends together thereby rigidly securing the ends of said girder-like members in relative position.

7. The combination defined in claim 3 in which the horizontal radius of the segmental membrane-like members at their midpoints is made to correspond with the principal horizontal radius of the tank.

8. The combination defined in claim 1 in which said girder-like members are proportioned as to depth from point to point to best resist the varying loads imposed upon them.

JAMES O. JACKSON.